(12) United States Patent
Neil

(10) Patent No.: US 6,480,681 B1
(45) Date of Patent: *Nov. 12, 2002

(54) ADJUSTABLE VIEWFINDER OPTICAL SYSTEM FOR SHOULDER-SUPPORTED CAMERAS

(75) Inventor: Iain A. Neil, Calabasas, CA (US)

(73) Assignee: Panavision, Inc., Woodland Hills, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 09/643,897

(22) Filed: Aug. 18, 2000

Related U.S. Application Data
(60) Provisional application No. 60/150,913, filed on Aug. 26, 1999.

(51) Int. Cl.[7] .................. G03B 13/02; G03B 13/06; G03B 13/08
(52) U.S. Cl. .................. 396/373; 396/382; 396/383; 396/384; 396/385
(58) Field of Search .................. 396/373, 382, 396/383, 384, 385, 386

(56) References Cited

U.S. PATENT DOCUMENTS

| | | | | |
|---|---|---|---|---|
| 3,913,116 A | * | 10/1975 | Kastner et al. | |
| 4,118,720 A | | 10/1978 | Gottschalk | 354/81 |
| 4,389,675 A | | 6/1983 | Suzuki et al. | 358/229 |
| 4,705,374 A | * | 11/1987 | Robings | 354/225 |
| 4,859,058 A | | 8/1989 | Ekstrand | 356/251 |
| 5,920,426 A | | 7/1999 | Neil | 359/428 |
| 6,056,449 A1 | * | 5/2001 | Hart | 396/421 |
| 6,252,729 B1 | * | 6/2001 | Kanai | 359/834 |
| 6,256,144 B1 | * | 7/2001 | Kato | 359/432 |

* cited by examiner

Primary Examiner—David M. Gray
Assistant Examiner—Melissa J Koval
(74) Attorney, Agent, or Firm—Lyon & Lyon LLP

(57) ABSTRACT

An adjustable viewfinder optical system for a shoulder-supported movie or video camera having interchangeable objective lenses. The system includes first and second lens groups aligned on an optical axis for receiving and relaying an image received from the objective lens of the camera to the viewer's eye. The first lens group is in a forwardly extending portion of the viewfinder that is pivotally joined to a rearwardly extending portion of the viewfinder containing the second lens group. The forwardly extending portion has a telescoping portion for varying the eye position of the viewer relative to the camera in the fore-and aft direction. The light is collimated between the first and second lens groups at the telescoping portion, whereby the image viewed in the viewfinder remains in focus and the same magnification throughout the telescoping adjustment movement.

28 Claims, 14 Drawing Sheets

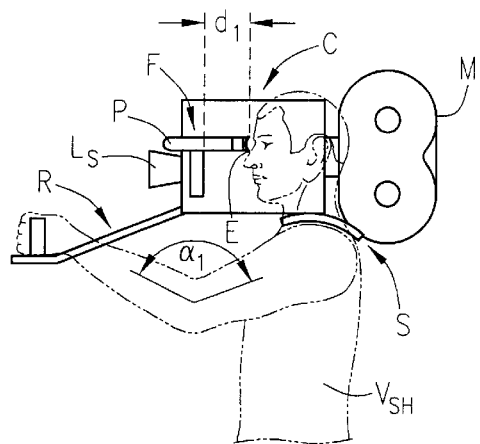
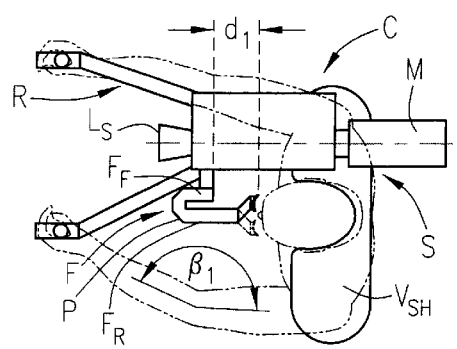
Fig. 1A  Fig. 1B
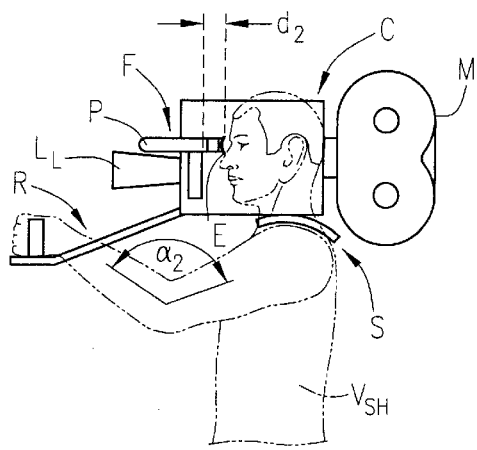
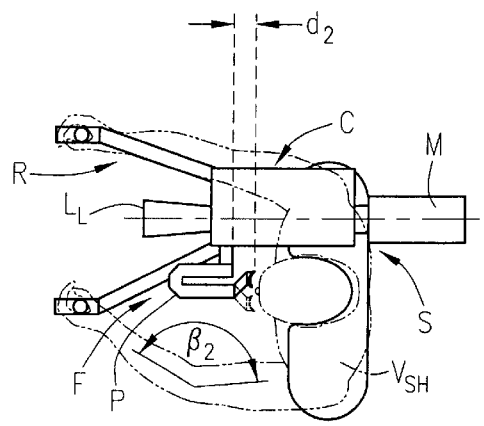
Fig. 2A  Fig. 2B

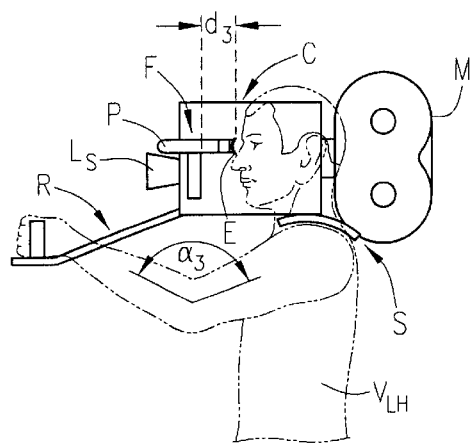
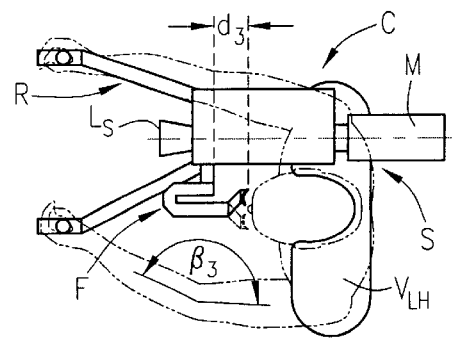
Fig. 3A                Fig. 3B
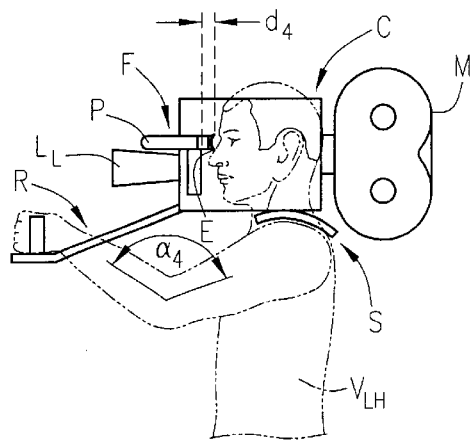
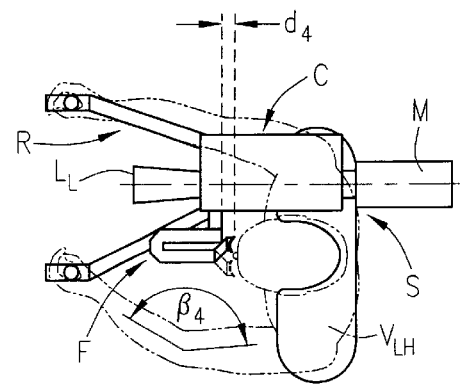
Fig. 4A                Fig. 4B

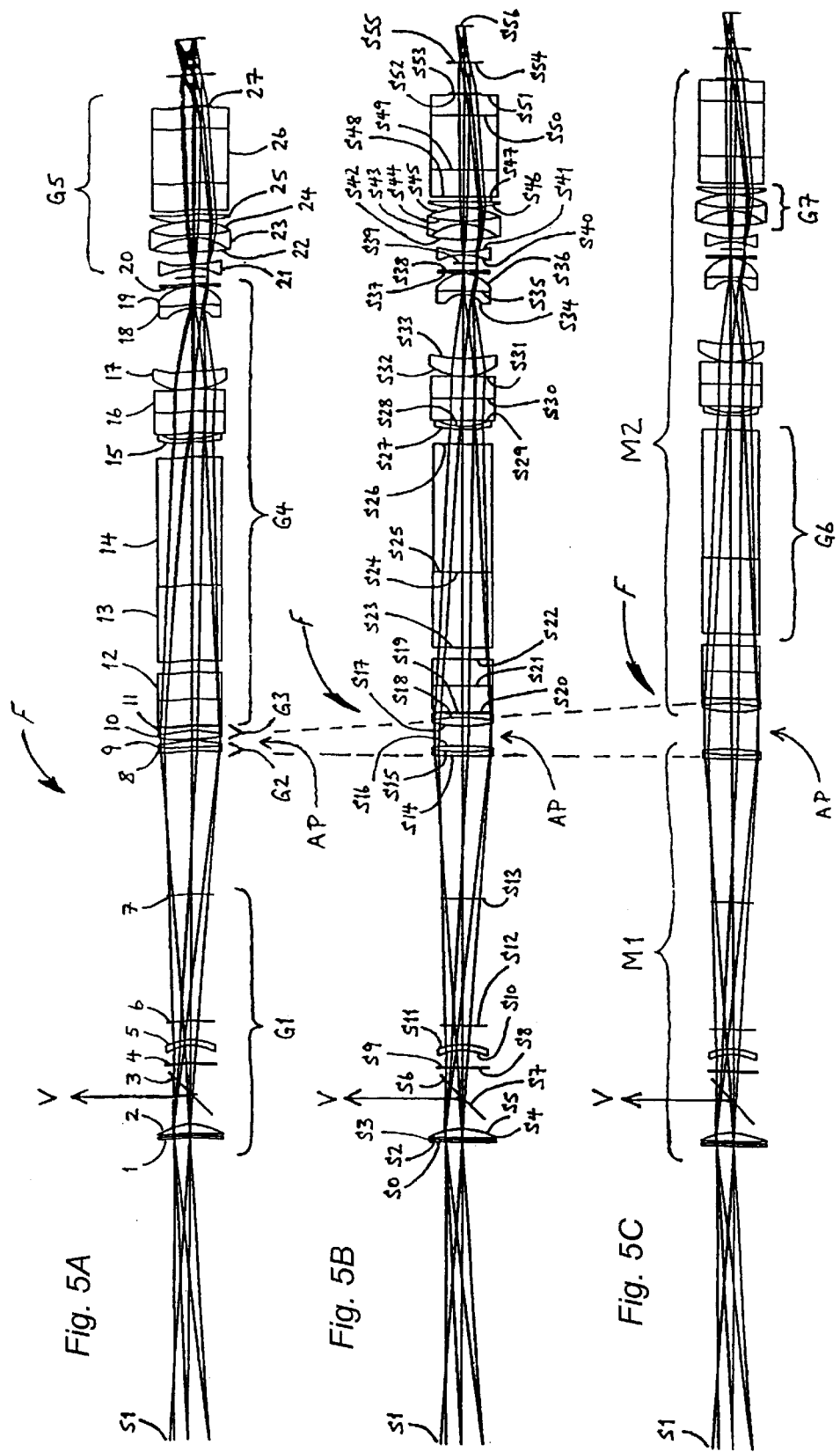

— — — 450.0 NM
— · · — · · 486.1 NM
——————— 546.1 NM
— · — · — · 587.6 NM
· · · · · · · · · 643.8 NM

```
— — — —   450.0 NM
— · · — · · —   486.1 NM
——————   546.1 NM
— · — · — ·   587.6 NM
- - - - - - -   643.8 NM
```

```
— — — — 450.0 NM
— · · — · · · — · · 486.1 NM
———————— 546.1 NM
— · — · — · — · 587.6 NM
· · · · · · · · · · 643.8 NM
```

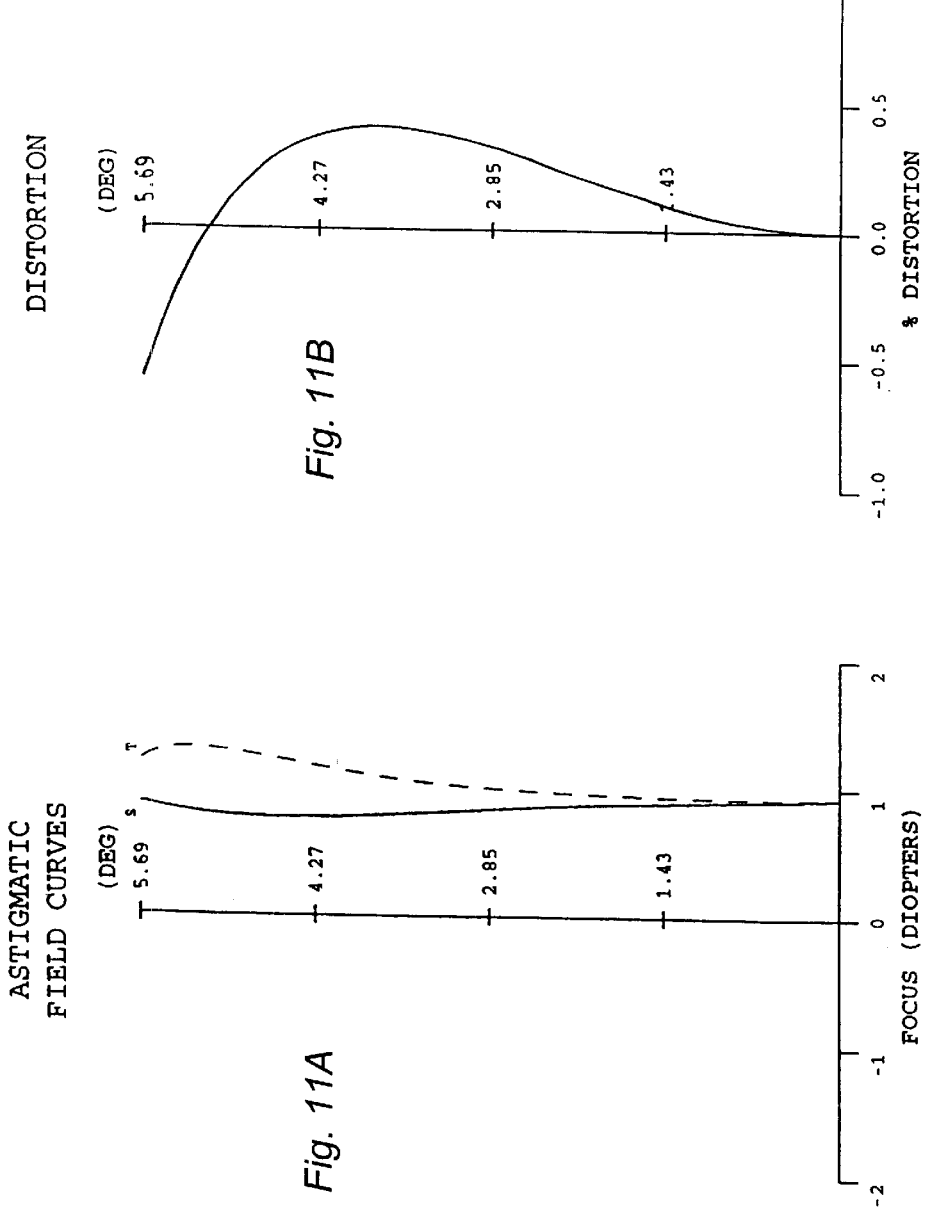

ADJUSTABLE VIEWFINDER OPTICAL SYSTEM FOR SHOULDER-SUPPORTED CAMERAS

This application claims the benefit of Provisional Application Ser. No. 60/150,913, filed Aug. 26, 1999.

This invention relates to an optical viewfinder for a film camera, video camera or the like and, in particular, to an optical viewfinder that is capable of multiple adjustments for providing a comfortable position for the viewer relative to the camera for a camera that is supported on the shoulder of the viewer.

In the filming of high quality movies, such as for theater viewing, and the video recording of high quality productions and the like, it has become popular for the camera to be supported on the shoulder of the viewer (a so-called "cameraman") so that certain scenes are shot with the intrinsic versatility offered by this hand-held approach, even though such cameras and the attached lens, film magazine, etc. may be rather heavy. For the optimum performance by and comfort of the cameraman, there should be an appropriate spatial relationship between the cameraman's eye when it is positioned at the viewfinder and the center of gravity of the camera and attachments that are supported on the cameraman's shoulder. That appropriate spatial relationship may differ from cameraman to cameraman depending on physical characteristics, such as head size, neck length, normal posture, etc., and personal preferences. Moreover, the center of gravity and weight of the camera may vary considerably depending on the choice of camera and the size, weight and geometry of the camera components and necessary equipment, for example, lens, film magazine, battery power supply, etc. In turn, the relative position of the camera and the cameraman's head, when his eye is positioned on the eye cup of the viewfinder, and the weight and center of gravity of the camera, as a whole, varies substantially, which can be uncomfortable for the cameraman and even detract from the effective operation of the camera due to that discomfort and the inability to adjust the viewfinder to an optimum position for that camera and that combination of camera equipment.

Heretofore, the only solution to this problem has been to reconfigure the camera components, where possible, to try to achieve a compromise based on the physical characteristics and preferences of the average cameraman and the average camera with attached components, whereby the viewfinder eye cup position and the camera center of gravity on the cameraman's shoulder provide an acceptable but not optimal arrangement for most cameraman and all camera configurations. However, reconfiguration of the camera components and the possible addition of dummy weights on the camera for balance substantially reduce the flexibility and versatility of the camera operation thereby defeating the purpose for which the shoulder supported (often referred to as "hand-held") camera is intended. Also, there is very little space within which to locate a viewfinder on a shoulder supported camera because the camera is very close to the cameraman's head. Moreover, ideally the weight of the viewfinder must be minimized.

Other inherent problems exist in providing a high performance camera viewfinder that will accommodate every cameraman, such as near-sightedness, far-sightedness, preference for using the right or left eye, etc., in addition to adjusting the position of the eye cup relative to the camera, all of which optimally must be done without changing the size or quality of the image viewed by the cameraman.

Therefore, it is an object of the present invention to provide a novel viewfinder for a hand-held type camera that is normally supported on the cameraman's shoulder by an appropriate frame and pad, which viewfinder provides a variably adjustable eye viewing position for the cameraman. Specifically, the invention alleviates problems created by variations in weight and center of gravity of the camera, where supported on the cameraman's shoulder, and allows each cameraman to select an optimum position for the eye cup of the viewfinder based on the physical characteristics and personal preferences of that cameraman.

Another object of the present invention is to provide an adjustable viewfinder for a shoulder supported camera, which viewfinder includes lens groups that create a real image in the viewfinder that remains in focus and at the same magnification throughout telescopic longitudinal movement of the lens groups toward and away from each other during fore-and-aft adjustment of the viewfinder to optimize the eye cup position.

A further object of the present invention is to provide such an adjustable viewfinder that has an eye viewing position, which position is related to the exit pupil position and residual aberrations thereof, that is nearly constant in position with any variation being easily accommodated by a small adjustment in eye viewing position at the eye cup of the viewfinder.

A still further object of the present invention is to provide an internal focusing lens group that is selectively adjustable for accommodating different eye conditions of the viewer/cameraman, such as, near and far sightedness (myopia and hyperopia, respectively), without requiring movement of the eye cup or the viewer's eye. Another and still further object of the present invention is to provide such an adjustable viewfinder that is selectively orientable to optimally position the exit pupil of the viewfinder for either left or right eye viewing, as preferred by the cameraman, with the camera positioned on the same side of the cameraman's head, i.e. without switching the viewfinder from one side of the camera to the other.

Still another and further object of the present invention is to provide such an adjustable viewfinder that may include other features that may be desirable and are often included in viewfinders, such as, optical deanamorphosing, optical or mechanical means for constant image orientation, electrical demisting of the last lens element, visible and/or lighted picture frame lines observable through the viewfinder, etc. without inhibiting the adjustability of the viewfinder.

Other and more detailed objects and advantages of the present invention will readily appear to those skilled in the art from the following description of a preferred embodiment and the Drawings, wherein:

FIGS. 1A and 1B are diagrammatic side elevation and plan views, respectively, of a cameraman with a shoulder supported camera having the adjustable viewfinder of the present invention, and illustrating an adjustment position of the viewfinder to accommodate a cameraman with a smaller than average sized head and a camera with a small lens;

FIGS. 2A and 2B are diagrammatic side elevation and plan views, respectively, of a cameraman with a shoulder supported camera having the adjustable viewfinder of the present invention, and illustrating an adjustment position of the viewfinder to accommodate a cameraman with a smaller than average sized head and the same camera as illustrated in FIGS. 1A and 1B but with a large lens;

FIGS. 3A and 3B are diagrammatic side elevation and plan views, respectively, of a cameraman with a shoulder supported camera having the adjustable viewfinder of the present invention, and illustrating an adjustment position of the viewfinder to accommodate a cameraman with a larger than average sized head and the same camera as illustrated in FIGS. 1A and 1B but with a small lens;

FIGS. 4A and 4B are diagrammatic side elevation and plan views, respectively, of a cameraman with a shoulder supported camera having the adjustable viewfinder of the present invention, and illustrating an adjustment position of the viewfinder to accommodate a cameraman with a larger than average sized head and the same camera as illustrated in FIGS. 1A and 1B but with a large lens;

Figures 6A, 6B:
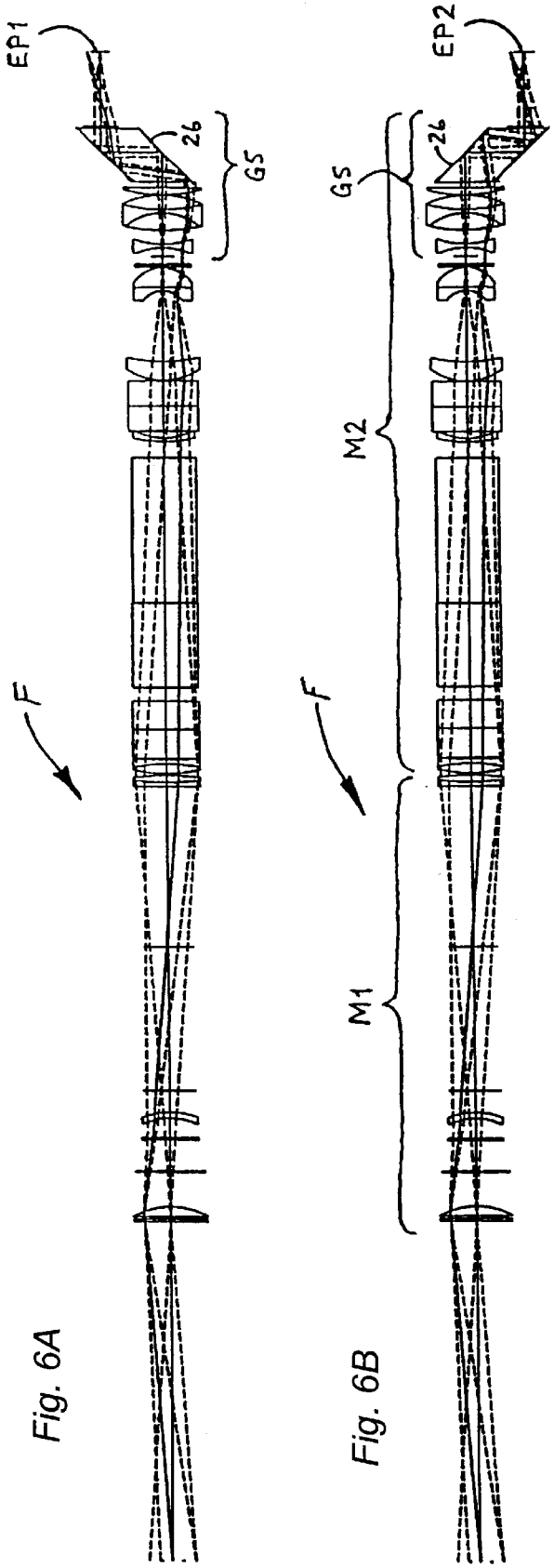
Figure 7A:
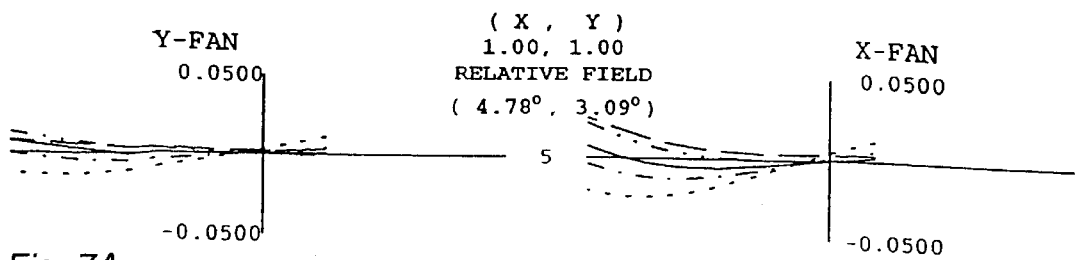
Figure 7B:
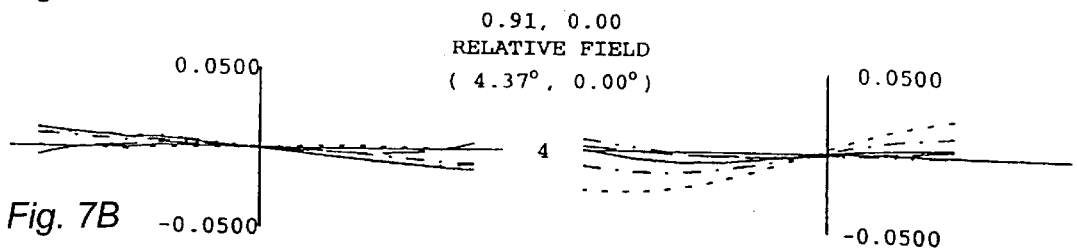
Figure 7C:
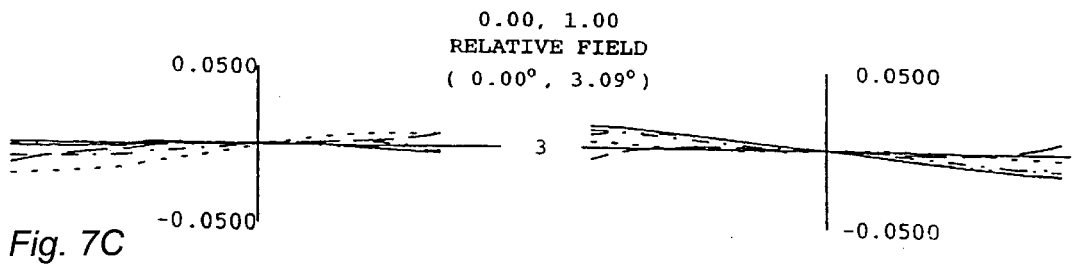
Figure 7D:
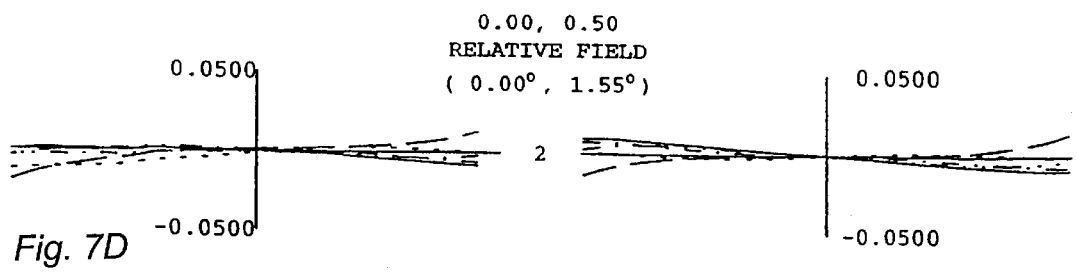
Figure 7E:
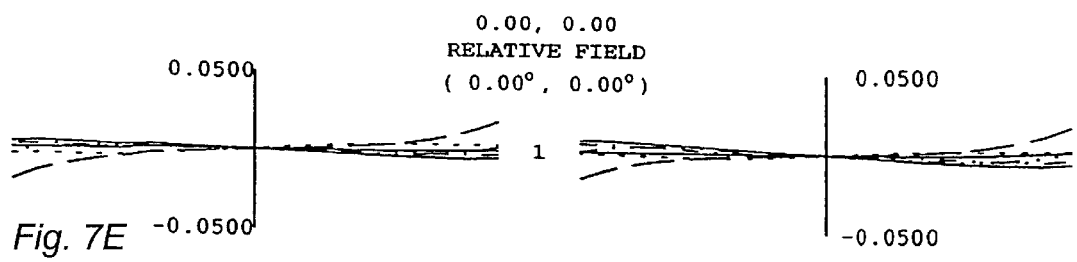
Figure 8A:
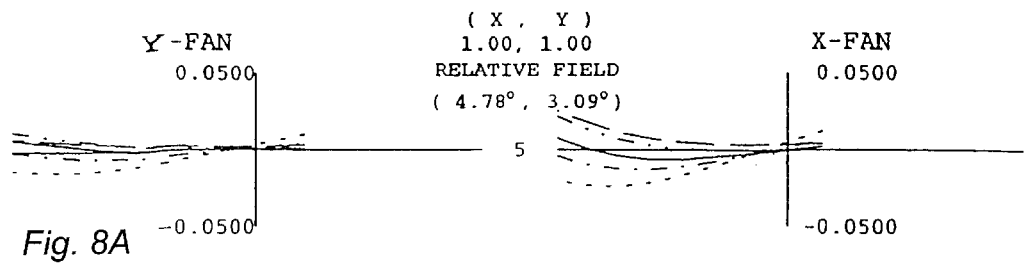
Figure 8B:
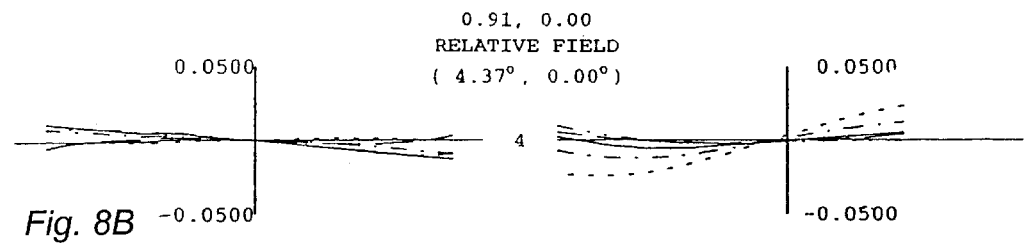
Figure 8C:
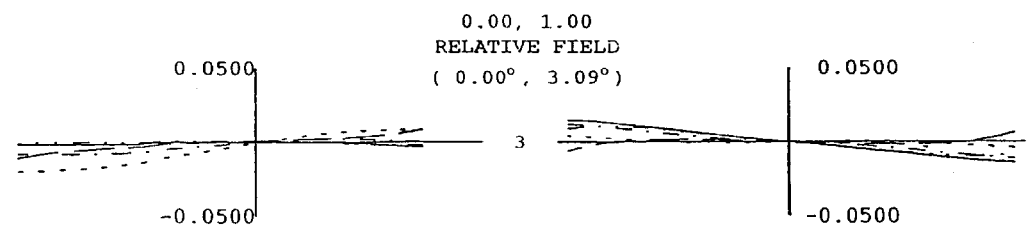
Figure 8D:
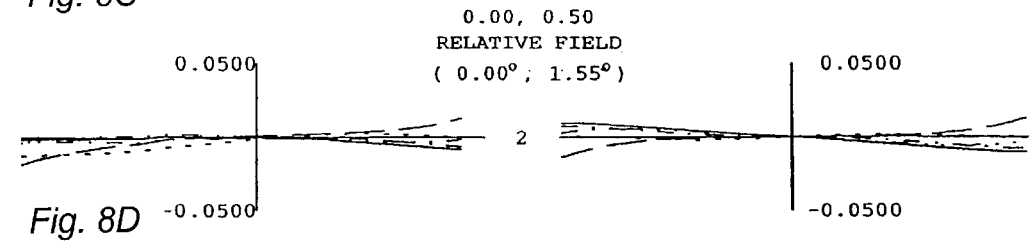
Figure 8E:
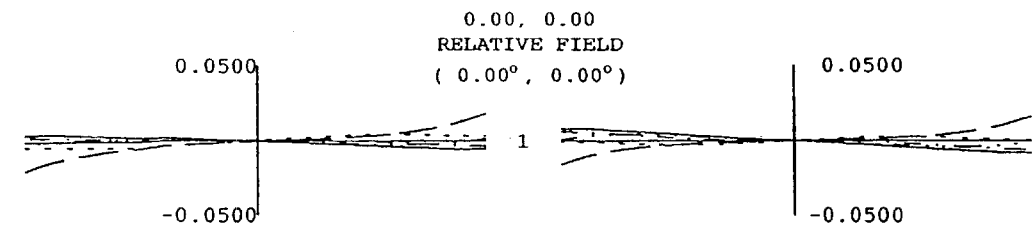
Figure 9A:
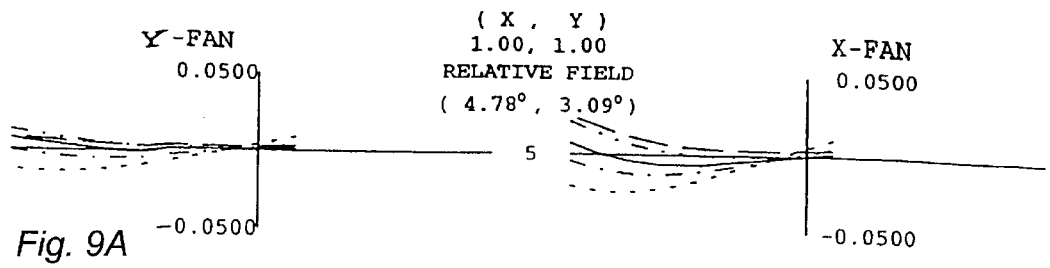
Figure 9B:
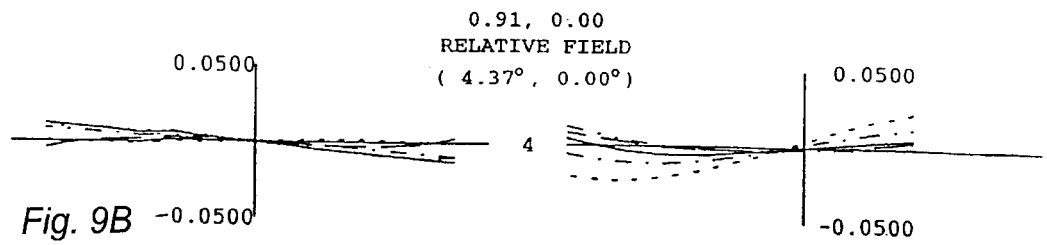
Figure 9C:
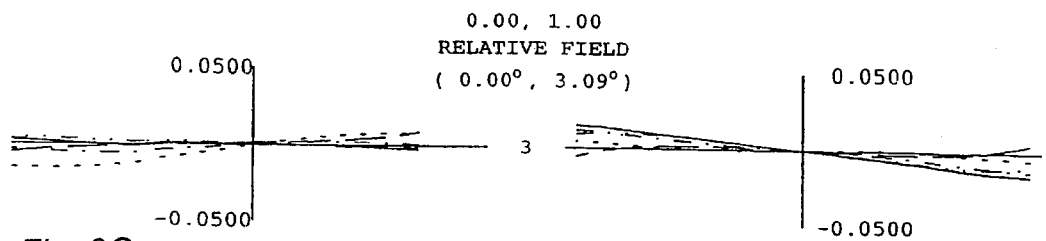
Figure 9D:
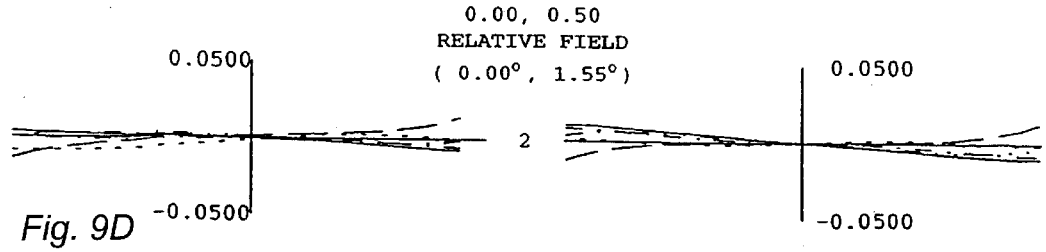
Figure 9E:
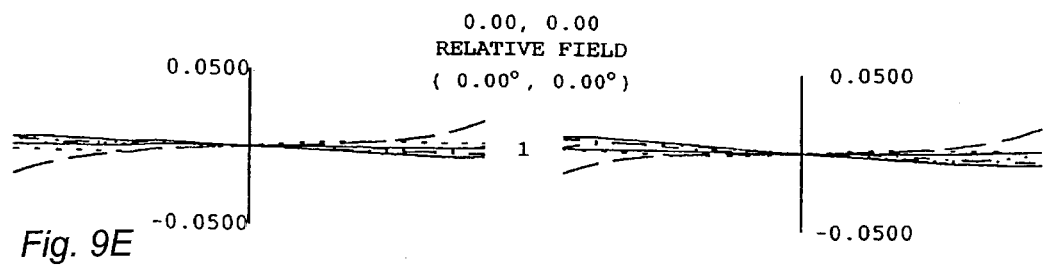
Figure 10B:
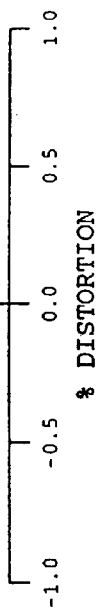
Figure 10A:
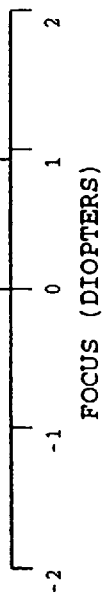
Figure 12B:
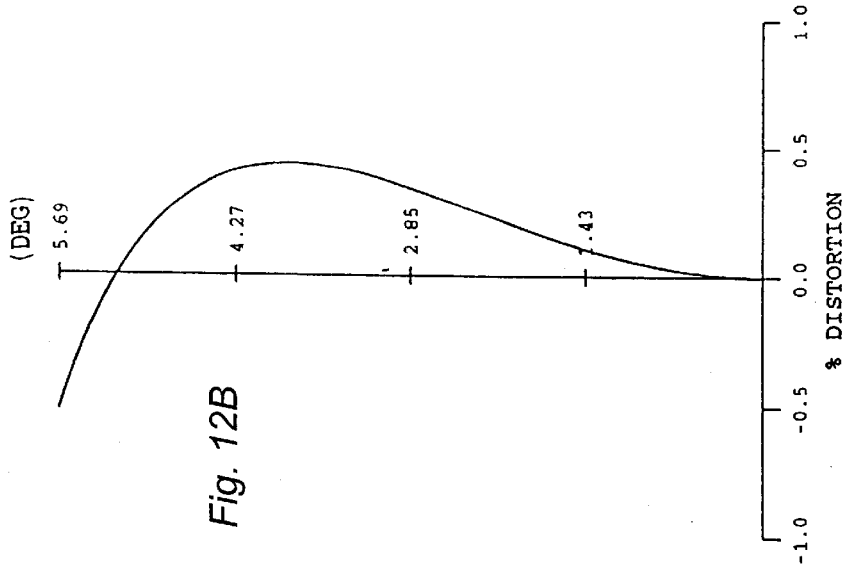
Figure 12A:
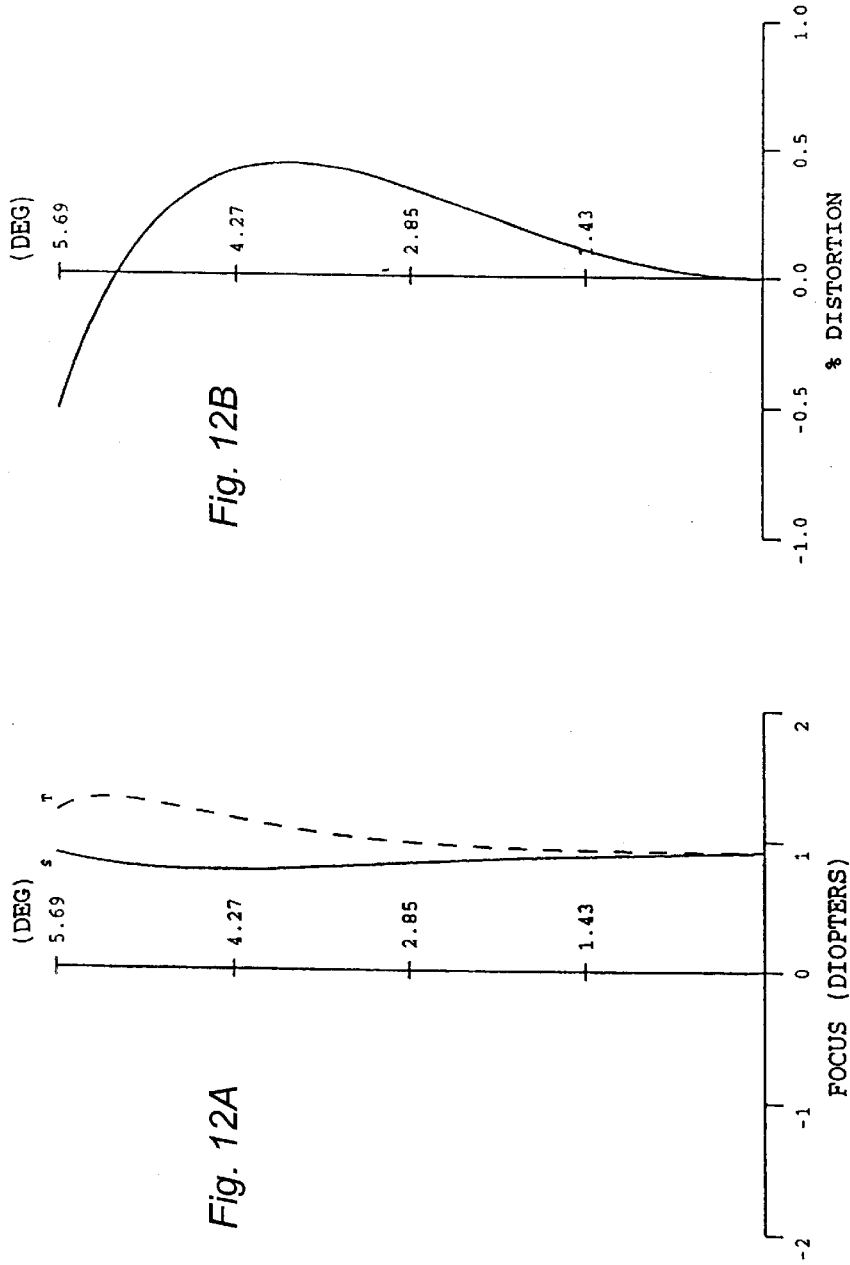
Figure 13:
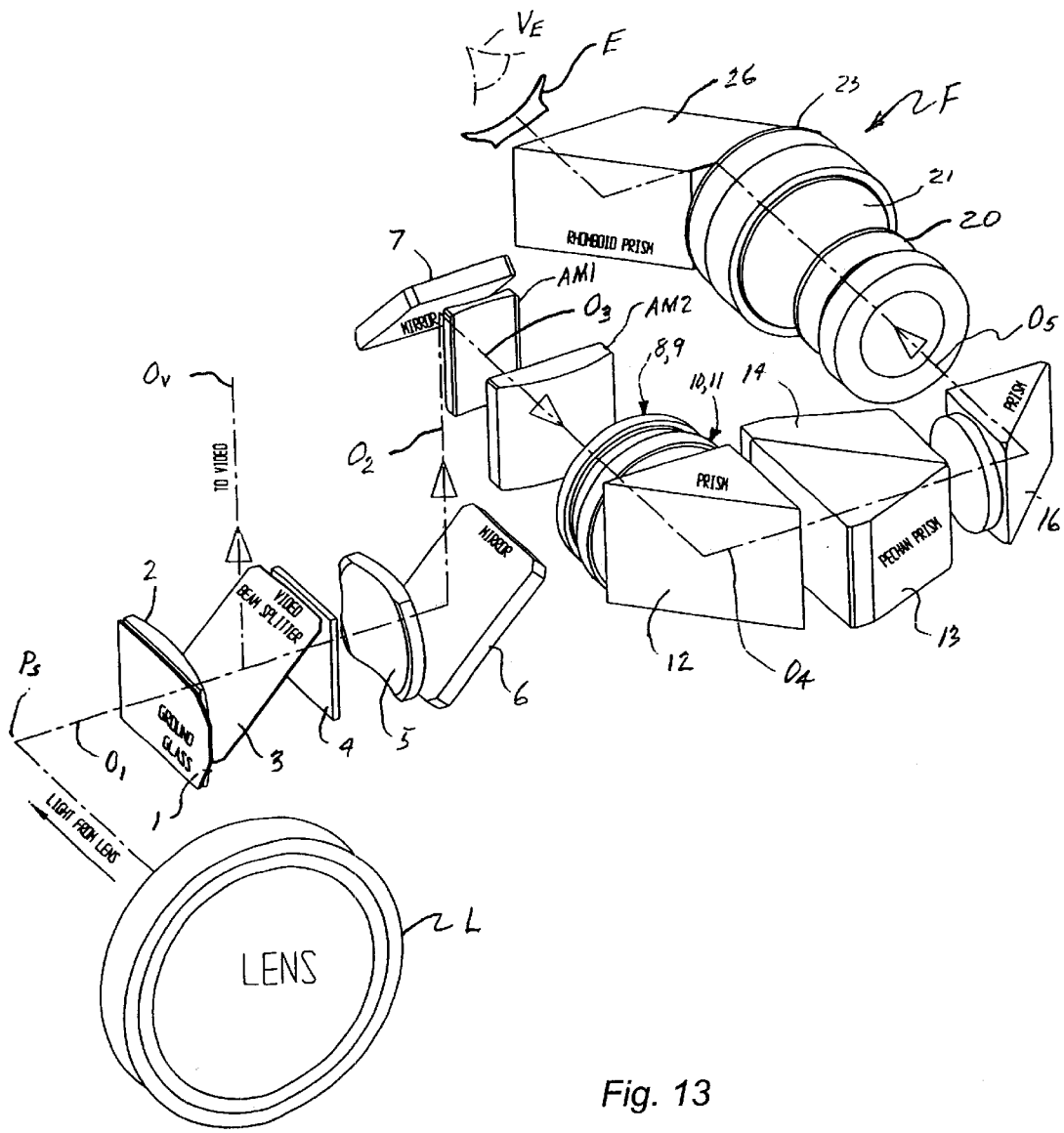
Figure 14A:
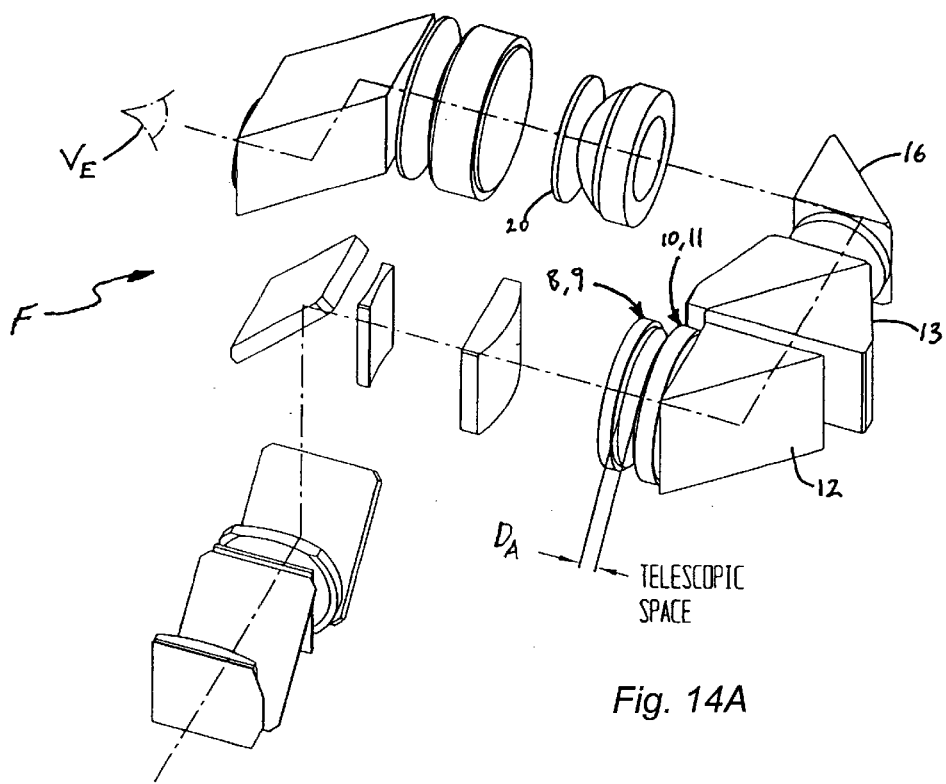
Figure 14B:
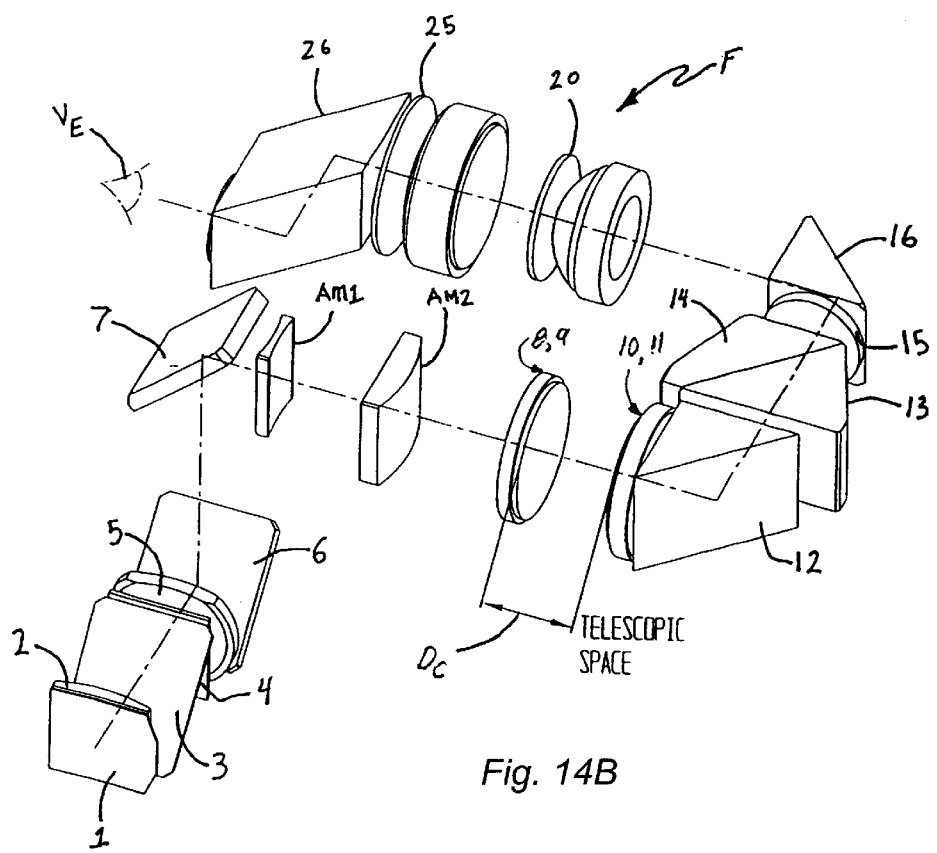
Figure 15A:
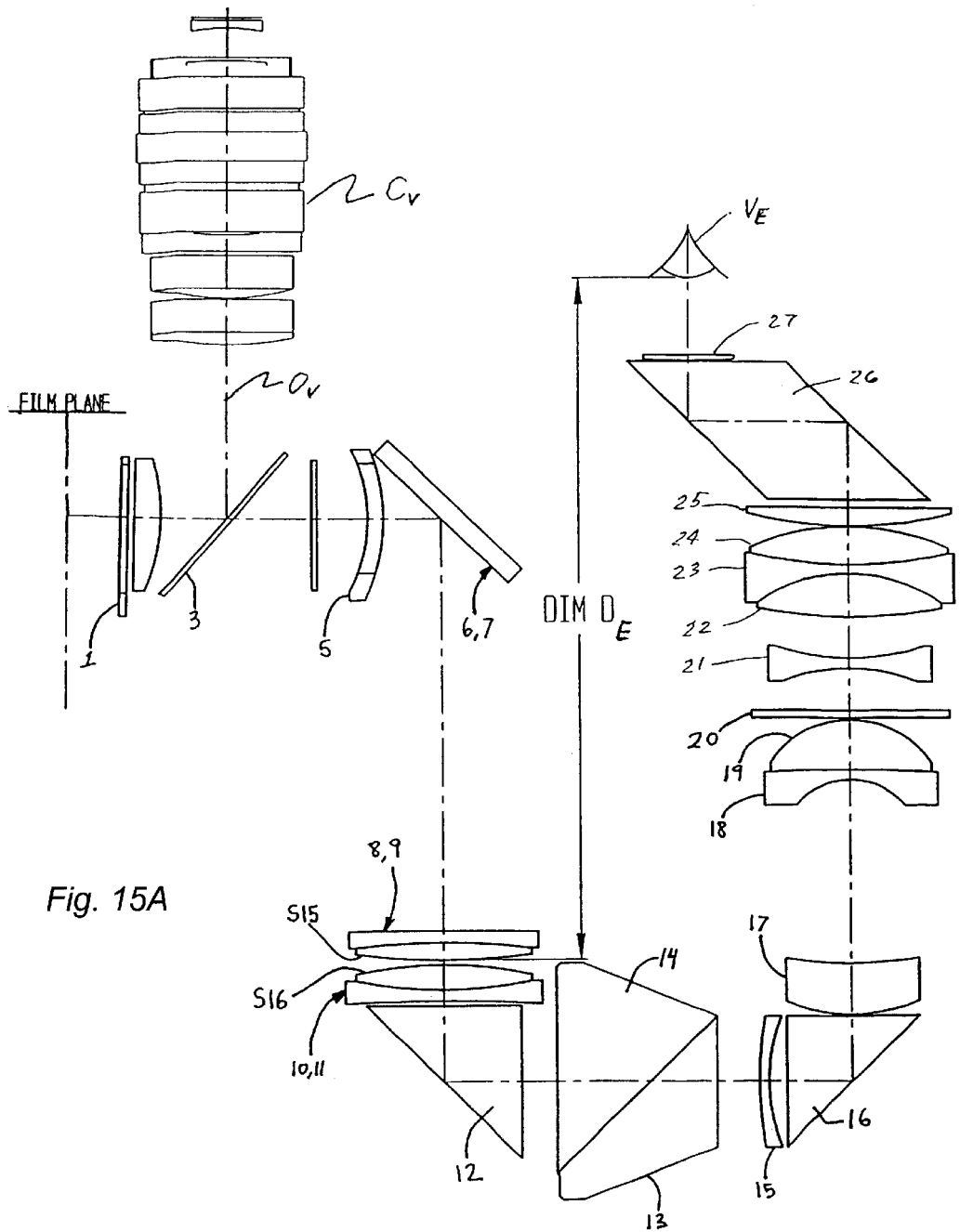
Figure 15B:
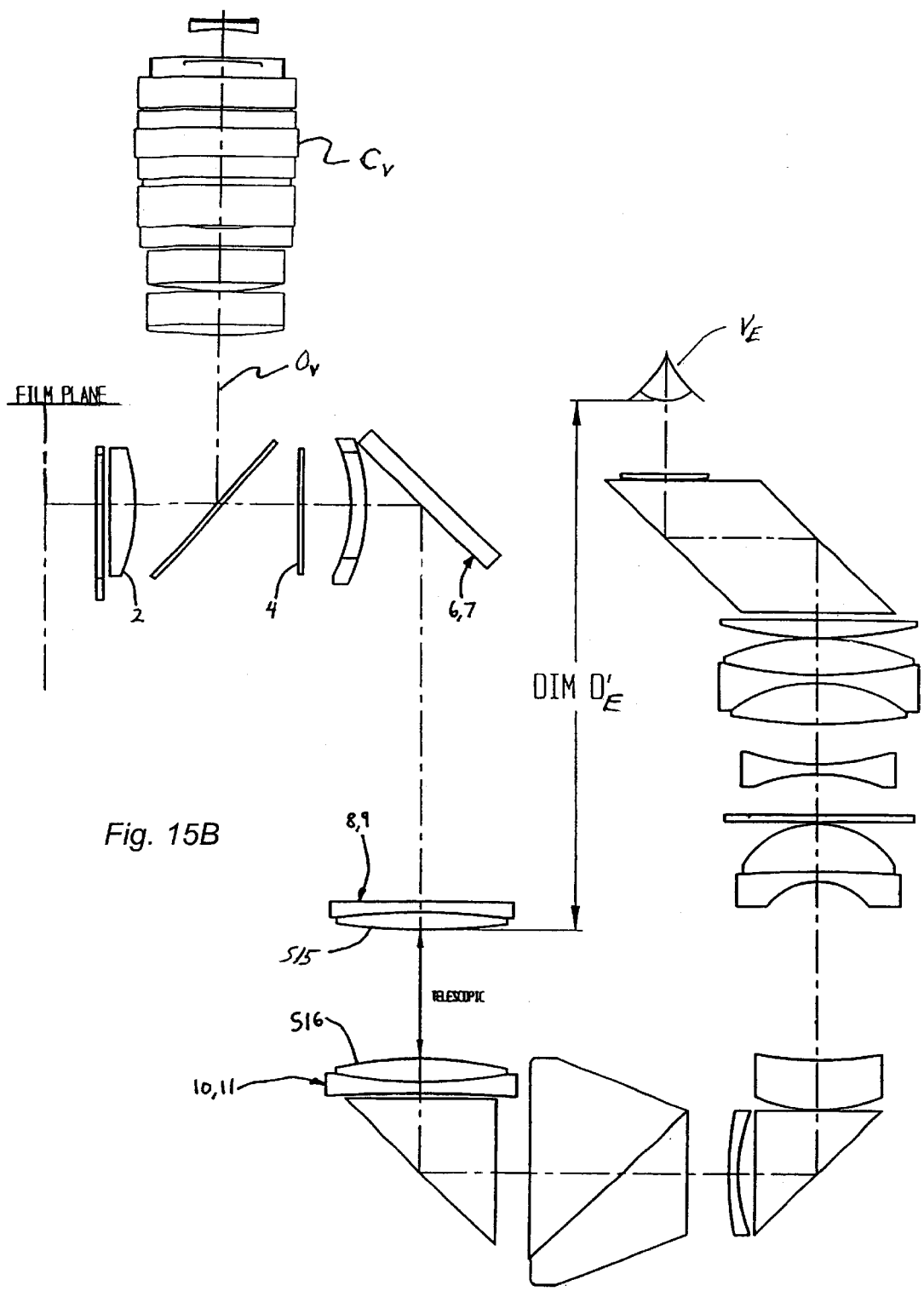

FIGS. 5A, 5B and 5C are optical diagrams of the preferred embodiment of the adjustable viewfinder of the present invention showing the optical axis as a straight line, rather than including the multiple angles that exist in the physical embodiment of the adjustable viewfinder, as described below, and with the viewfinder in three adjusted positions, namely, shortest, medium and longest length, respectively;

FIGS. 6A and 6B are optical diagrams similar to FIGS. 5A–5C but specifically as plan views for showing the optical element and its positions for accommodating left eye or right eye viewing by the cameraman;

FIGS. 7A through 7E are ray aberration graphs illustrating the performance of the viewfinder optical system of this invention in the position of the longitudinal telescoping portion of the viewfinder shown in FIG. 5A;

FIGS. 8A through 8E are ray aberration graphs illustrating the performance of the viewfinder optical system of this invention in the position of the longitudinal telescoping portion of the viewfinder shown in FIG. 5B;

FIGS. 9A through 9E are ray aberration graphs illustrating the performance of the viewfinder optical system of this invention in the position of the longitudinal telescoping portion of the viewfinder shown in FIG. 5C;

FIGS. 10A and 10B are graphs of the astigmatism and distortion characteristics for the viewfinder optical system of this invention in the position of the longitudinal telescoping of the viewfinder shown in FIG. 5A;

FIGS. 11A and 11B are graphs of the astigmatism and distortion characteristics for the viewfinder optical system of this invention in the position of the longitudinal telescoping of the viewfinder shown in FIG. 5B;

FIGS. 12A and 12B are graphs of the astigmatism and distortion characteristics for the viewfinder optical system of this invention in the position of the longitudinal telescoping of the viewfinder shown in FIG. 5C;

FIG. 13 is a diagrammatic perspective view of the optical components of the adjustable viewfinder optical system of this invention;

FIGS. 14A and 14B are diagrammatic perspective views similar to FIG. 13 of the optical elements of the adjustable viewfinder optical system of this invention and illustrating the two extreme positions of the longitudinal telescopic movement of the viewfinder corresponding to the optical diagrams of FIGS. 5A and 5C, respectively; and FIGS. 15A and 15B are simplified diagrammatic plan views of the optical elements of the adjustable viewfinder of the optical system of this invention and illustrate the two extreme positions of longitudinal telescopic adjustment of the viewfinder corresponding to the optical diagrams of FIGS. 5A and 5C respectively.

The general arrangement of the adjustable viewfinder of the present invention and the manner in which it is used by a cameraman will be described first in connection with FIGS. 1A through 4B before providing a detailed description of the optical system of the adjustable viewfinder of this invention. The camera body C is mounted on a shoulder support rig R that preferably is adjustable and has a shoulder support pad S for supporting the camera and camera attachments on the right shoulder of the cameraman/viewer, who is identified in the drawings as a viewer $V_{SH}$ having a smaller than average sized head or a viewer $V_{LH}$ having a larger than average sized head for purposes of illustrating the range of adjustments of the viewfinder of the present invention. The camera support rig R may include one or two forwardly extending handles that the cameraman may grip for stabilizing the motion of the camera body C. A lens is mounted on and projects from the front of the camera body C and such lens may be a relatively light and small lens $L_S$ or a relatively heavy and large lens $L_L$, as shown on the various figures, which obviously changes the weight of the camera assembly and shifts the center of gravity thereof forward and aft. A magazine M for movie film or video tape is typically mounted on the rear of the camera body C and the size of the magazine M and the amount of film or tape therein may vary whereby again the overall weight and the center of gravity of the camera assembly may shift fore-and-aft. Because of these variables in lens and magazine weight and size, the most comfortable position for supporting the camera body C on the shoulder of the cameraman by the shoulder support pad S will vary and therefore the camera body C may be shifted fore-and-aft with respect to the camera support rig R. Normally, with prior art viewfinders this fore-and-aft shift can create some uncomfortable positions for the head of the cameraman, who must place his eye socket on the flexible eye cup E of the viewfinder, which positions may be very awkward and objectionable during a long day of shooting.

The adjustable viewfinder F of the present invention is mounted on the side of the camera body C and, as will appear more fully from subsequently described Figures, the viewfinder F has successive sections that extend laterally outwardly, then upwardly, then forwardly, then laterally outwardly again and finally rearwardly toward the head of the cameraman. The viewfinder F includes a pivot point P to allow pivotal movement of the rearwardly extending portion $F_R$ of the viewfinder about an axis extending horizontally and laterally of the camera body C. By reason of the optical system of the present invention, the forwardly extending portion $F_F$ of the viewfinder F is longitudinally adjustable in a telescoping manner for moving the eye cup E fore-and-aft relative to the camera body C for accommodating the most comfortable position for the cameraman's eye which, as noted above, will vary depending on the physical characteristics and personal preferences of the cameraman. For example, FIGS. 1A and 1B illustrate a small lens $L_S$ and a cameraman with a relatively small head whereby the rear portion $F_R$ and eye cup E of the viewfinder F are moved rearwardly a maximum distance, as shown by a distance $d_1$ from the eye cup E to the mounting location of the viewfinder on the camera. On the other hand, FIGS. 2A and 2B illustrate an arrangement with the same cameraman with the relatively small head and, a large lens $L_L$ whereby the camera body C is preferably shifted rearwardly to accommodate the forward shift in the center of gravity of the assemblage caused by the large lens $L_L$ and, therefore, the distance $d_2$ from the eye cup E to the viewfinder mount is smaller than distance $d_1$ illustrated in FIGS. 1A and 1B. Thus, for a comfortable position of the camera C on the shoulder and the eye cup E on the eye socket, the same cameraman needs a viewfinder of different lengths. Similarly, with the same small lens $L_S$ and a cameraman with a relatively large head, the distance $d_3$, as shown in FIGS. 3A and 3B, may not be as large as distance $d_1$ shown in FIGS. 1A and 1B but probably is not as small as the distance $d_2$ of FIGS. 2A and 2B. Still further, with a large lens $L_L$ and the same cameraman with a relatively large head, as shown in FIGS. 4A and 4B, the distance $d_4$ of the viewfinder F may be very small for achieving a comfortable weight balance and eye cup E position.

While FIGS. 1A through 4B illustrate the rear portion $F_R$ as being substantially horizontal for a simplified comparison of the various conditions, it should be understood that such rearwardly extending portion $F_R$ may be pivoted upwardly or downwardly about pivot point P for the comfort of the individual cameraman and that such pivotal adjustment may also require telescopic adjustment of the forwardly extending portion $F_F$ It should be noted that the distance between the pivot point P and the eye cup E is constant throughout these Figures because the longitudinal adjustment is accomplished in the forwardly extending portion $F_F$ of the viewfinder F. Also, it should be noted that the bend angles at the elbow of the cameraman/viewer may vary, as shown in these Figures, to accommodate the shifting position of the camera body C required by the shift in the center of gravity thereof and the personal preferences of the cameraman/viewer, and again these changes in angles can be accommodated with the adjustable viewfinder of the present invention. For example, the angles $\alpha_1$, $\alpha_2$, $\alpha_3$ and $\beta_4$ in the vertical plane and the angles $\beta_1$, $\beta_2$, $\beta_3$ and $\beta_4$ in the horizontal plane vary substantial among FIGS. 1A to 4B.

Referring now to FIGS. 5A–5C, the optical diagrams of the optical elements of the viewfinder F are shown in three different positions of the telescopic adjustment of the viewfinder F, and with all of the optical elements arranged on a straight optical axis rather than illustrating such optical elements on an optical axis that makes the multiple bends that exist in the physical structure shown in FIGS. 1A through 4B, whereby the optical diagrams are more easily understood. The only physical difference among the tQ FIGS. 5A, 5A, 5B and 5C is in the axial distance at the adjustment position AP, which changing distance is graphically illustrated by the dashed lines extending between FIGS. 5A, 5A, 5 Band 5C. FIG. 5A illustrates the shortest length, FIG. 5B illustrates a medium length and FIG. 5C illustrates the longest length of the viewfinder F. In FIGS. 5A–5C, for convenience of identification and description, each of the optical elements along the optical axis is identified by a numeral 1 through 27, each of the surfaces of those elements is identified by an "S" followed by a numeral, each group of optical elements is identified by a "G" followed by a numeral, and the major groups of optical elements that are movable relative to each other for telescopic adjustment are identified by M1 and M2.

Further, for clarity of illustration, the numerals and letters are not provided on each of the three FIGS. 5 because of the multiplicity thereof. The optical elements and their locations are identified and their specifications are set forth in TABLE 1 below. In the following TABLE 1 the optical elements are identified by the numbers corresponding to the numerals in FIGS. 5A–5C, namely, the optical elements are listed in the first column labeled "Item", the group to which each element belongs is identified in the column labeled "Group", the surface of each element is identified in the column labeled "Surface", the position of each element for each of the three representative positions A, B and C (corresponding to the positions illustrated in FIGS. 5A, 5B and 5C, respectively) of the elements is identified in the column labeled "Adjustment Position", the distance between the preceding surface and each surface of the elements is set forth in the column labeled "Separation", the radius of curvature, if any, of each element surface is set forth in the column labeled "Radius of Curvature", the material of each element is given by type, code and name in the three columns under the label "Material", and the "Maximum Aperture Diameter" at that surface is set forth in the last column which bears that label. The footnotes at the end of TABLE 1 provide additional information and identify any unusual characteristics of this optical prescription that may be necessary for a complete understanding by one skilled in the art. All of the data in TABLE 1 and all of the graphs and curves in FIGS. 7A through 12B are given for a temperature of 20° C. (68° F.) and standard atmospheric pressure (760mmHg).

TABLE 1

| Item | Group | Surface | Adjustment Position | Separation (mm) | Radius of Curvature (mm) | Material Type | Material Code | Material Name* | Maximum Aperture Diameter (mm) |
|---|---|---|---|---|---|---|---|---|---|
| Objective Image Plane@ | | S0 | ALL | −172.697 | Flat | Air | | | |
| Stop | | S1 | ALL | 172.697 | Flat | Air | | | 23.42 |
| 1 | G1 | S2 | ALL | 1.397 | Flat | Glass | 516642 | BK7 | 34.41 |
| | | S3 | ALL | 1.295 | Flat | Air | | | 34.70 |
| 2 | G1 | S4 | ALL | 5.207 | Flat | Glass | 516642 | BK7 | 35.10 |
| | | S5 | ALL | 17.500 | −38.100 | Air | | | 35.28 |
| 3 | G1 | S6# | ALL | 0.530 | Flat | Glass | 516642 | BK7 | — |
| | | S7#$ | ALL | 16.000 | Flat | Air | | | — |
| 4 | G1 | S8 | ALL | 1.000 | Flat | Glass | 516642 | BK7 | 26.53 |
| | | S9 | ALL | 9.939 | Flat | Air | | | 26.38 |
| 5 | G1 | S10 | ALL | 3.068 | −30.470 | Glass | 804396 | S-LAH63 | 24.75 |
| | | S11 | ALL | 11.132 | −37.556 | Air | | | 25.69 |
| 6 | G1 | S12 | ALL | 73.025 | Flat | Mirror | | | — |
| 7 | G1 | S13 | ALL | 81.966 | Flat | Mirror | | | — |
| 8 | G2 | S14 | ALL | 2.250 | 1545.036 | Glass | 689311 | PBM28 | 31.13 |
| 9 | G2 | S15 | ALL | 3.534 | 127.025 | Glass | 614550 | BSM9 | 31.38 |
| | | S16 | A | 1.000 | −125.458 | Air | | | 31.52 |
| | | | B | 11.160 | | | | | |
| | | | C | 21.320 | | | | | |
| 10 | G3 | S17 | ALL | 4.866 | 77.550 | Glass | 622532 | BSM22 | 31.52 |
| 11 | G3 | S18 | ALL | 2.200 | −85.062 | Glass | 720347 | BPH8 | 31.38 |
| | | S19 | ALL | 1.000 | 313.208 | Air | | | 31.17 |

TABLE 1-continued

| Item | Group | Surface | Adjustment Position | Separation (mm) | Radius of Curvature (mm) | Material Type | Code | Name* | Maximum Aperture Diameter (mm) |
|---|---|---|---|---|---|---|---|---|---|
| 12 | G4 | S20 | ALL | 15.000 | Flat | Glass | 516642 | BK7 | 31.16 |
|  | G4 | S21# | ALL | 15.000 | Flat | Glass | 516642 | BK7 | — |
|  |  | S22 | ALL | 6.750 | Flat | Air |  |  | 31.00 |
| 13 | G4 | S23 | ALL | 43.361 | Flat | Glass | 620363 | F2 | 30.72 |
|  |  | S24# | ALL | 0.050 | Flat | Air |  |  | — |
| 14 | G4 | S25# | ALL | 74.021 | Flat | Glass | 620363 | F2 | — |
|  |  | S26 | ALL | 8.452 | Flat | Air |  |  | 29.51 |
| 15 | G4 | S27 | ALL | 1.880 | 67.910 | Glass | 532489 | PBL6 | 29.34 |
|  |  | S28 | ALL | 3.438 | 33.481 | Air |  |  | 28.76 |
| 16 | G4 | S29 | ALL | 12.700 | Flat | Glass | 516642 | BK7 | 28.81 |
|  | G4 | S30# | ALL | 12.700 | Flat | Glass | 516642 | BK7 | — |
|  |  | S31 | ALL | 0.300 | Flat | Air |  |  | 33.19 |
| 17 | G4 | S32 | ALL | 10.100 | 31.234 | Glass | 762401 | S-LAM55 | 34.65 |
|  |  | S33 | ALL | 36.407 | 76.802 | Air |  |  | 31.92 |
| 18 | G4 | S34 | ALL | 2.000 | −12.915 | Glass | 923213 | PBH71 | 19.40 |
| 19 | G4 | S35 | ALL | 10.000 | −250.322 | Glass | 804466 | LAH65 | 24.32 |
|  |  | S36 | ALL | 0.400 | −17.962 | Air |  |  | 27.62 |
| 20 | G4 | S37 | ALL | 1.397 | Flat | Glass | 516642 | BK7 | 26.51 |
|  |  | S38 | ALL | 3.929 | Flat | Air |  |  | 26.36 |
| Intermediate Image |  | S39 | ALL | 4.526 | — | Air |  |  | — |
| 21 | G5 | S40 | ALL | 2.000 | −33.379 | Glass | 487702 | S-FSL5 | 25.68 |
|  |  | S41 | ALL | 7.233 | 42.554 | Air |  |  | 27.78 |
| 22 | G5 | S42 | ALL | 8.601 | 93.180 | Glass | 804466 | LAH65 | 33.86 |
| 23 | G5 | S43 | ALL | 1.750 | −29.616 | Glass | 847239 | PBH53W | 34.32 |
| 24 | G5 | S44 | ALL | 7.713 | 79.030 | Glass | 835427 | LAH55 | 37.37 |
|  |  | S45 | ALL | 0.100 | −45.034 | Air |  |  | 37.80 |
| 25 | G5 | S46 | ALL | 3.639 | 77.134 | Glass | 883408 | LAH58 | 36.76 |
|  |  | S47 | ALL | 2.750 | Flat | Air |  |  | 36.32 |
| 26 | G5 | S48 | ALL | 15.500 | Flat | Glass | 804466 | LAH65 | 34.64 |
|  | G5 | S49# | ALL | 31.000 | Flat | Glass | 804466 | LAH65 | — |
|  | G5 | S50# | ALL | 11.750 | Flat | Glass | 804466 | LAH65 | — |
|  |  | S51 | ALL | 0.150 | Flat | Air |  |  | 15.72 |
| 27 | G5 | S52 | ALL | 1.172 | 109.855 | Glass | 835427 | LAH55 | 15.47 |
|  |  | S53 | A | 15.000 | Flat | Air |  |  | 15.13 |
|  |  |  | B | 14.650 |  |  |  |  |  |
|  |  |  | C | 14.300 |  |  |  |  |  |
| Eye Pupil Position |  | S54 | ALL | 0.000 | — | — | — | — | — |
| Perfect Eye Lens** |  | S55 | ALL | 23.015 | — | — | — | — | — |
| Image Plane*** |  | S56 | ALL |  | Flat | — | — | — | — |

Footnotes to Table 1:
*ALL material name designations are for Ohara glasses except for BK7 (Items 1, 2, 3, 4, 12, 16 and 20) and F2 (Items 13 and 14) which are for Schott glasses.
@ Maximum objective image height is 14.453 mm (X axis) and 9.355 mm (Y axis).
$ A decentration of 0.125 mm occurs at Surface S7 (Item 3) and is compensated for by a decentration of Surfaces S8 to S56 (Items 4 to Image Plane) to keep them all substantially centered.
Surfaces S6, S7, S21, S24, S25, S30, S49 and S50 are positionally tilted with respect to other surfaces
**Surface S55 emulates a perfect eye lens of focal length 22.5 mm which produces no residual optical aberrations including field curvature, hence the flat image plane.
***Flat image plane is equivalent to the retina of a human eye.

From the foregoing TABLE 1 and FIGS. 5A–5C, it may be observed that the length of the adjustment position AP between surfaces S16 and S17 is variable from 1.000 mm in position "A" to 21.320 mm in position "C", which are the extreme positions, and position "B" represents an intermediate position. FIGS. 5A–5C also illustrate that the ray traces throughout the range of telescopic adjustment of the viewfinder F do not change perceptibly, whereby the view observed by the cameraman through the viewfinder F remains the same size and in focus throughout the range of longitudinal adjusting movement and the image quality also remains essentially the same. This is confirmed by the ray aberration diagrams of FIGS. 7A–7E for position A, FIGS. 8A–8E for position B, FIGS. 9A–9E for position C, and the astigmatic field curves and distortion curves of FIG. 10A and 10B for position A, FIGS. 11A and 11B for position B, and FIGS. 12A and 12B for position C, which positions A, B and C are the same as those listed in Table 1 and shown in FIGS. 5A–5C, respectively. In FIGS. 7A–7E, 8A–8E and 9A–9E the various graph lines show operating wavelengths between 450.0 nanometers (nm) and 643.8 nm. Specifically, the long dash line is for 450.0 nm, the short dash with two dots line is for 486.1 nm the solid line is for 546.1 nm, the short dash with one dot is for 587.6 nm, and the very short dash line is for 643.8 nm.

Referring now to FIGS. 6A and 6B, which are optical diagrams similar to FIG. 5A and represent plan views of the viewfinder with the rhomboid prism 26 in two different positions. The rhomboid prism 26 is mounted in a elbow section of the viewfinder F that is pivotable about the axis of the rearwardly extending portion $F_R$, and the eye cup E is attached to that elbow section. In FIG. 6A the elbow section and rhomboid prism 26 are pivoted to the right in position EP1 for viewing by the right eye of the cameraman and in FIG. 6B they are pivoted to the left in position EP2 for viewing by the left eye of the cameraman. It should be noted that position EP1 of FIG. 6A is shown in solid lines in the plan views of FIGS. 1B, 2B, 3B and 4B, and the position EP2 of FIG. 6B is shown in dashed lines in those same plan views FIGS. 1B, 2B, 3B and 4B.

Referring now to FIG. 13, a diagrammatic perspective view of the optical system of the viewfinder F is shown in a three-dimensional manner with an objective lens L that would be mounted on the front of the camera body C. The light from the lens L is reflected at a point $P_s$ by a mirrored shutter in the camera body C in front of the film plane to send the light along a first optical axis $O_1$ in a conventional manner. The optical elements beyond point $P_s$ are shown in FIGS. 5A–5C and listed in TABLE 1 but now will be described in their physical relationship. After the point $P_s$, the light rays and axis $O_1$ are directed toward the exterior of the camera body C into the start of the viewfinder F body. A first intermediate image produced by the objective lens L is formed on a ground glass 1 within the camera body in a conventional manner. A partial mirror or beam splitter 3 directs some of the light along a video optical axis $O_v$ to a video camera $C_V$ (see FIGS. 15A and 15B) for monitoring the scene taken by the lens L, which also is conventional for high quality professional movie cameras. The video camera $C_V$ is mounted in a housing (not shown) that is mounted on the outside of the camera body C. The light rays passing through the beam splitter 3 also pass through a dummy window 4 and a lens 5 to a mirror 6. The mirror 6 reflects the light along another optical axis $O_2$ upwardly to a mirror 7 that reflects the light forwardly along the third optical axis $O_3$ which is the horizontal axis of the forwardly extending portion $F_F$ shown in FIGS. 1A–4B. A prism 12 reflects the light along a fourth optical axis $O_4$ through a Pechan prism comprising glass elements 13 and 14. Optical axis $O_4$ comprises the pivotal axis extending horizontally and laterally of the camera body C at the pivot point P, as shown in FIGS. 1A–4B. A Pechan prism 13 is provided on axis $O_4$ for automatically orienting the image to remain upright as the viewfinder rear portion $F_R$ is pivoted about the horizontal axis $O_4$. A prism 16 reflects the light from optical axis along a fifth optical axis $O_5$ to the rhomboid prism 26 which then reflects the light to the eye cup E for viewing by the eye $V_E$ of the cameraman/viewer V at the eye cup E. The distances along the aforedescribed axes portions of the optical axis remain the same, except between the doublet lens 8, 9 and the doublet lens 10, 11 which are axially separable along axis $O_3$ for changing the distance at the adjustment position AP. As shown in TABLE 1, this adjustable distance is between surfaces S16 and S17 and is variable between 1,000 mm and 21.320 mm in this embodiment. The light rays are collimated or substantially parallel between surfaces S16 and S17, as shown in FIGS. 5A–5C, whereby the image viewed by the cameraman/viewer V remains the same throughout the adjusting movement. The dummy window 4 of zero optical power is preferably provided for allowing the viewfinder F to be removed from the camera (at the video camera housing, not shown, mounted on the camera body C) for using other viewfinders or only a video monitor. Also, the ground glass 1 may be plain glass for improving the video pick-up and then a ground glass would be provided at the location of dummy window 20 where a second intermediate image is formed.

Optical elements AM1 and AM2 shown in FIG. 13 (not shown in FIGS. 5A–5C or on TABLE 1) are for optically deanamorphosing the image if the lens L is an anamorphic lens, and those two elements may be physically displaced from the optical axis $O_3$ when a spherical lens L is being used, whereby the cameraman always views a normal picture through the viewfinder F. Optical lens elements 22–25 (more clearly shown in FIGS. 15A and 15B) comprise an eye focus lens group and are adjustable for accommodating the particular eye condition of the cameraman, i.e. near or far sightedness. For the adjustment positions of FIGS. 5A, 5A, 5B and 5C, there also is a very small adjustment of the perfect eye position as shown by the Adjustment Positions A, B and C, respectively, following surface S53 in TABLE 1.

Referring now to FIGS. 14A and 14B, which are diagrammatic perspective views of the optical system of viewfinder F and are similar to FIG. 13, although viewed from a slightly different perspective, the telescopic adjustment between doublet 8, 9 and doublet 10, 11 is graphically shown by the minimum distance $D_A$ and the maximum distance $D_c$, which correlate to the spaces represented by the Adjustment Positions A and C set forth in TABLE 1 and illustrated in FIGS. 5A and 5C, respectively. Similarly, it can be seen from FIGS. 15A and 15B, which are simplified plan views of the optical system that, for example, show mirrors 6 and 7 as a single mirror, that the dimension $D_E$ between the viewer's eye $V_E$ and the surface S15 of the doublet 8, 9 changes from one telescopic position in FIG. 15A to the other telescopic position shown in FIG. 15B. Thus, FIGS. 14A, 14B, 15A and 15B illustrate that the camera body C may be moved forwardly and rearwardly with respect to the viewer's eye $V_E$ and shoulder S, or, conversely, the eye $V_E$ can be moved relative to the camera body C. FIGS. 15A and 15B correspond to the optical diagrams of FIGS. 5A and 5C, respectively, and also diagrammatically illustrate the video camera $C_V$ located on the video axis $O_v$ in the camera body C, although for illustration purposes the video camera $C_V$ is rotated from the vertical position to a horizontal position. Also, a demister element 27 is shown that is conventionally included in professional camera viewfinders and here is provided with weak optical power, as shown in the table by Radius of Curvature of its Surface S52.

Although the present invention has been described in connection with the specific embodiment of the viewfinder F with specific optical elements and dimensions, it will readily be appreciated by those skilled in the art that different optical elements and dimensions may be used. For example, the range of travel between the extreme adjustment positions AP for the specific embodiment disclosed is 20.32 mm (21.32 mm in position C minus 1.00 mm in position A) but that distance can be made larger or smaller to provide any desired or necessary range for, as an example, different cameras. However, the aforedescribed embodiment is so compact that the entire viewfinder optical system that is mounted on the side of the camera body C, including the video camera $C_V$ and its housing that mount directly to the side of the camera body C, i.e. all of the optical elements from ground glass 1 on optical axis $O_1$ through the rhomboid prism 26 and demister 27 on optical axis $O_5$, fits within a right angled box having a longitudinal length of only 6.586 inches (167.28 mm), a lateral width of only 6.536 inches (166.01 mm) (only 4.811 inches without the video camera portion) and a height of only 4.281 inches (1 08.74 mm), which is very important for a small, lightweight professional camera suitable for being supported on the shoulder of the cameraman/viewer. The exterior physical dimensions of only the portion of the viewfinder F that is removable at dummy window 4, i.e. excluding the video camera $C_V$ and its housing mounted on the side of the camera body, but including the barrels, adjustment rings, eye cup, and housings for optical element 4 through 27 are only 8.330 (211.58 mm) long, 5.348 inches (135.84 mm) wide and 5.151 inches (130.84 mm) high. Thus, from all of the above it will be readily apparent to those skilled in the art that the aforedescribed viewfinder F accomplishes each of the objects set forth above in the summary of the invention.

| Item | Surface | Separation (mm) | Radius of Curvature (mm) | Material Type | Maximum Aperture Diameter (mm) |
|---|---|---|---|---|---|
| Objective Image Plane | S0 | −172.697 | Flat | Air | |
| Stop | S1 | 172.697 | Flat | Air | 23.42 |
| 1 | S2 | 1.397 | Flat | Glass | 34.41 |
| | S3 | 1.295 | Flat | Air | 34.70 |
| 2 | S4 | 5.207 | Flat | Glass | 35.10 |
| | S5 | 17.500 | −38.100 | Air | 35.28 |
| 3 | S6 | 0.530 | Flat | Glass | — |
| | S7 | 16.000 | Flat | Air | — |
| 4 | S8 | 1.000 | Flat | Glass | 26.53 |
| | S9 | 9.939 | Flat | Air | 26.38 |
| 5 | S10 | 3.068 | −30.470 | Glass | 24.75 |
| | S11 | 11.132 | −37.556 | Air | 25.69 |
| 6 | S12 | 73.025 | Flat | Mirror | — |
| 7 | S13 | 81.966 | Flat | Mirror | — |
| 8 | S14 | 2.250 | 1545.036 | Glass | 31.13 |
| 9 | S15 | 3.534 | 127.025 | Glass | 31.38 |
| | S16 | 1.000 to 21.320 | −125.458 | Air | 31.52 |
| 10 | S17 | 4.866 | 77.550 | Glass | 31.52 |
| 11 | S18 | 2.200 | −85.062 | Glass | 31.38 |
| | S19 | 1.000 | 313.208 | Air | 31.17 |
| 12 | S20 | 15.000 | Flat | Glass | 31.16 |
| | S21 | 15.000 | Flat | Glass | — |
| | S22 | 6.750 | Flat | Air | 31.00 |
| 13 | S23 | 43.361 | Flat | Glass | 30.72 |
| | S24 | 0.050 | Flat | Air | — |
| 14 | S25 | 74.021 | Flat | Glass | — |
| | S26 | 8.452 | Flat | Air | 29.51 |
| 15 | S27 | 1.880 | 67.910 | Glass | 29.34 |
| | S28 | 3.438 | 33.481 | Air | 28.76 |
| 16 | S29 | 12.700 | Flat | Glass | 28.81 |
| | S30 | 12.700 | Flat | Glass | — |
| | S31 | 0.300 | Flat | Air | 33.19 |
| 17 | S32 | 10.100 | 31.234 | Glass | 34.65 |
| | S33 | 36.407 | 76.802 | Air | 31.92 |
| 18 | S34 | 2.000 | −12.915 | Glass | 19.40 |
| 19 | S35 | 10.000 | −250.322 | Glass | 24.32 |
| | S36 | 0.400 | −17.962 | Air | 27.62 |
| 20 | S37 | 1.397 | Flat | Glass | 26.51 |
| | S38 | 3.929 | Flat | Air | 26.36 |
| Intermediate Image | S39 | 4.526 | — | Air | — |
| 21 | S40 | 2.000 | −33.379 | Glass | 25.68 |
| | S41 | 7.233 | 42.554 | Air | 27.78 |
| 22 | S42 | 8.601 | 93.180 | Glass | 33.86 |
| 23 | S43 | 1.750 | −29.616 | Glass | 34.32 |
| 24 | S44 | 7.713 | 79.030 | Glass | 37.37 |
| | S45 | 0.100 | −45.034 | Air | 37.80 |
| 25 | S46 | 3.639 | 77.134 | Glass | 36.76 |
| | S47 | 2.750 | Flat | Air | 36.32 |
| 26 | S48 | 15.500 | Flat | Glass | 34.64 |
| | S49 | 31.000 | Flat | Glass | — |
| | S50 | 11.750 | Flat | Glass | — |
| | S51 | 0.150 | Flat | Air | 15.72 |
| 27 | S52 | 1.172 | 109.855 | Air | 15.47 |
| | S53 | 15.000 | Flat | Air | 15.13 |
| | | 14.650 | | | |
| | | 14.300 | | | |
| Eye Pupil Position | S54 | 0.000 | — | — | — |

What is claimed:

1. An adjustable viewfinder optical system for a shoulder-supported camera having interchangeable objective lenses, the system comprising:
   a first lens group aligned on a system optical axis for receiving and relaying an image received from the camera objective lens to an exit of said first lens group, said first lens group producing collimated light rays of the image at said exit, said exit and collimated light rays being along a first optical axis portion of said system optical axis that is in a first plane parallel to an optical axis of the objective lens;
   a second lens group having a portion aligned on said first optical axis portion for receiving the collimated light rays of the image from said first lens group and relaying the image to an eyepiece lens group on a second optical axis portion of said system optical axis for viewing the image, said second optical axis portion being in a second plane parallel to and spaced from said first plane; and
   said second lens group being telescopically movable on said first optical axis id portion relative to said first lens group with said image remaining in focus as viewed through said eyepiece lens means throughout the telescopic relative movement of said first and second lens groups.

2. The adjustable viewfinder optical system of claim 1, wherein said first lens group includes a ground glass on which a first intermediate image is formed by the objective lens as a real image for viewing by said eyepiece lens group.

3. The adjustable viewfinder optical system of claim 1, wherein said second lens group includes a ground glass on which an intermediate image is formed as a real image for viewing by said eyepiece lens group.

4. The adjustable optical viewfinder optical system of claim 1, wherein an intermediate optical axis portion of said system optical axis extends perpendicularly between said first and second optical axis portions.

5. The adjustable viewfinder optical system of claim 4, wherein said second optical axis portion is pivotable in said second plane about said intermediate optical axis.

6. The adjustable viewfinder optical system of claim 5, wherein said second lens group includes a Pechan prism for selectively orienting the image viewed.

7. The telescopic viewfinder optical system of claim 6, wherein said Pechan prism is located on said intermediate optical axis.

8. The adjustable viewfinder optical system of claim 7, wherein said first optical axis portion extends in a forward direction relative to the camera and parallel to an optical axis of the objective lens.

9. The adjustable viewfinder optical system of claim 1, further including a partial mirror on the system optical axis between the objective lens and said first optical axis portion for partially reflecting the image to a video camera.

10. The adjustable viewfinder optical system of claim 1, wherein said eyepiece lens group includes an eye focus lens group that is selectively movable along the second optical axis portion for accommodating various human eye conditions of persons viewing the real image.

11. The adjustable viewfinder optical system of claim 10, wherein said eyepiece lens group includes a rhomboid prism pivotable about said second optical axis portion for selectively positioning an eye cup relative to said second optical axis portion.

12. The adjustable viewfinder optical system of claim 1, wherein said first lens group includes a doublet lens immediately preceding said exit for producing the collimated light rays of the image at said exit.

13. The adjustable viewfinder optical system of claim 12, wherein said second lens group includes a doublet lens for receiving the collimated light rays of the image from said exit.

14. The adjustable viewfinder optical system of claim 1, wherein said first optical axis portion extends in a forward direction relative to the camera and parallel to an optical axis of the objective lens.

15. The adjustable viewfinder optical system of claim 1, wherein said eyepiece lens group includes a rhomboid prism pivotable about said second optical axis portion for selectively positioning an eye cup relative to said second optical axis portion.

16. The telescopic viewfinder optical system of claim 7, wherein said eyepiece lens group includes a rhomboid prism pivotable about said second optical axis portion for selectively positioning an eye cup relative to said second optical axis portion.

17. The adjustable viewfinder optical system of claim 16, wherein said eyepiece lens group includes an eye focus lens group that is selectively movable relative to the location of the real image for accommodating various human eye conditions of persons viewing the real image.

18. The telescopic viewfinder optical system of claim 7, wherein said second lens group includes an eye focus lens group that is selectively movable relative to the location of the real image for accommodating various human eye conditions of persons viewing the real image.

19. An adjustable viewfinder optical system for a shoulder-supported camera having interchangeable objective lenses, the system comprising:
   a first lens group aligned on a system optical axis for receiving and relaying an image received from the camera objective lens to an exit of said first lens group;
   a second lens group aligned on the system optical axis for receiving the light rays of the image from said first lens group and relaying the image to an eyepiece lens group for viewing;
   said second lens group being telescopically movable on a portion of the system optical axis relative to said first lens group with said image remaining substantially in focus and constant magnification throughout the telescopic relative movement of said first and second lens groups; and
   said first lens group comprised of items 1 through 9 and said second lens group comprised of items 10 through 26 set forth in the following table wherein the Object Plane item is the location of formation of a first real image from the camera, the Stop item is the location of the entrance stop, the Intermediate Image item is the location of an intermediate real image, the Eye Pupil Position is the location of the exit pupil for viewing said first real image or said intermediate real image, the Surface column identifies the surfaces of the items, the Separation column sets forth the distance from one surface to the next surface, the Radius of Curvature column sets forth the radius of that surface, the Material Type column identifies the material between that surface and the next surface, and the Maximum Aperture Diameter column sets forth the maximum diametric dimension of the light rays passing through the surface.

20. An adjustable viewfinder optical system for a shoulder-supported camera having interchangeable objective lenses, the system comprising:
   a first lens group aligned on a system optical axis for receiving and relaying an image received from the camera objective lens to an exit of said first lens group, said first lens group producing collimated light rays of the image at said exit, said exit and collimated light rays being along a telescoping optical axis portion of said system optical axis that is parallel to an optical axis of the objective lens;

a second lens group aligned on said telescoping optical axis portion for receiving the collimated light rays of the image from said first lens group and relaying the image from an exit of said second lens groups, said second lens group being telescopically movable on said telescoping optical axis portion relative to said first lens group;

means for reflecting the image from said second lens group exit laterally along an intermediate optical axis portion perpendicular to said telescoping optical axis portion and then reflecting the image from said intermediate optical axis portion perpendicularly along an eyepiece optical axis portion to form an intermediate image on the eyepiece optical axis portion; said eyepiece optical axis portion being pivotable about said intermediate optical axis portion in a plane parallel to said telescoping optical axis portion;

an orienting prism mounted on and rotatable about the system optical axis for correcting the orientation of the image for the pivotable movement of the eyepiece optical axis portion;

an eyepiece lens group aligned on said eyepiece optical axis portion for viewing the intermediate image; said eyepiece lens group including a rhomboid prism pivotably mounted on said eyepiece optical axis portion for pivoting between right and left eye viewing positions relative to said eyepiece optical axis portion.

21. The adjustable viewfinder optical system of claim 20, wherein said eyepiece lens group includes a ground glass on which the intermediate image is formed as a real image for viewing by said eyepiece lens group.

22. The adjustable viewfinder optical system of claim 20, wherein said orienting prism is a Pechan prism for selectively orienting the image viewed.

23. The telescopic viewfinder optical system of claim 22, wherein said Pechan prism is located on said intermediate optical axis portion.

24. The adjustable viewfmder optical system of claim 20, wherein said telescoping optical axis portion extends in a forward direction relative to the camera.

25. The adjustable viewfinder optical system of claim 20, further including a partial mirror on the system optical axis between the objective lens and said first optical axis portion for partially reflecting the image to a video camera.

26. The adjustable viewfinder optical system of claim 20, wherein said eyepiece lens group includes an eye focus lens group that is selectively movable along the eyepiece optical axis portion for accommodating a variation in human eye conditions of persons viewing the intermediate image.

27. The adjustable viewfinder optical system of claim 20, wherein said first lens group includes a doublet lens immediately preceding said exit for producing the collimated light rays of the image at said exit.

28. The adjustable viewfmder optical system of claim 27, wherein said second lens group includes a doublet lens for receiving the collimated light rays of the image from said exit.

* * * * *